United States Patent [19]

Williams et al.

[11] 4,140,030

[45] Feb. 20, 1979

[54] POWER TRANSMISSION

[75] Inventors: John E. Williams, Oshkosh; Beverly W. Keese, Neenah, both of Wis.

[73] Assignee: Rockwell International Corporation, Pittsburgh, Pa.

[21] Appl. No.: 708,991

[22] Filed: Jul. 26, 1976

[51] Int. Cl.² .......................... F16H 1/44; F16D 43/21
[52] U.S. Cl. .......................................... 74/711; 180/49; 192/20; 192/103 R; 192/54; 74/665 T
[58] Field of Search ................. 74/665 GD, 711, 715, 74/665 S, 665 T; 192/20, 103 R, 54; 180/44 R, 49

[56] References Cited

FOREIGN PATENT DOCUMENTS

| 668220 | 7/1934 | Fed. Rep. of Germany | 192/20 |
| 7557 of | 1915 | United Kingdom | 74/715 |

Primary Examiner—Stephen C. Bentley

[57] ABSTRACT

A drive transfer assembly for a low profile vehicle. The assembly is mounted to a differential housing and includes an input and axially aligned output shafts. One of the output shafts is preferably a pinion shaft for the primary axle differential. A clutch is operative under certain conditions to drive the other output shaft. A spring biased disc clutch is disclosed. The transfer assembly will provide a full four-wheel drive in the clutch engaged mode of operation and in the other mode of operation, depending upon the size of biasing force of the springs employed, may either deliver some proportion of the available torque to the auxiliary axle or allow the auxiliary axle to run free as in a conventional vehicle.

10 Claims, 5 Drawing Figures

POWER TRANSMISSION

BACKGROUND OF THE INVENTION

Field of the Invention—This invention relates to a torque transfer assembly and, more specifically, to a drive transfer assembly for a four-wheel drive vehicle.

Description of the Prior Art—Transfer assemblies providing four-wheel drive capability are desirable for many vehicles which are used on rough terrain as well as on relatively smooth surfaced roadways. Four-wheel drive utility vehicles are commercially available and relatively well known. The four-wheel drive is used primarily as the vehicle is traveling, normally at a higher rate of speed, on a surfaced roadway.

In such vehicles the rear axle normally serves as a primary driving axle and the front axle serves as an auxiliary driving axle when the wheels on the rear axle fail to provide the desired traction. The transfer of torque from the primary driving axle to the auxiliary driving axle may be effected automatically or by manual operation.

As in conventional driving axles, both the primary and the auxiliary driving axles are provided with differentials to accommodate differences in the speed of rotation of the wheels at each end of a single axle. In a four-wheel drive vehicle it is also necessary to accommodate different speeds of rotation between the wheels mounted on the primary driving axle and the wheels mounted on the auxiliary driving axle. Such wheel speed differences between the axles may occur as a result of a difference in the effective diameter of the front and rear wheels due to the vehicle load, a difference in the length of the arcuate paths traveled by the front and rear wheels while negotiating a turn, or by one set of wheels spinning or stopping due to the loss of friction or an obstacle in the path of travel.

The inter-axle wheel speed differential may be accommodated by the torque or drive transfer mechanism. U.S. Pat. Nos. 2,331,908 and 2,105,918 to J. E. Henningsen and A. W. Herrington, respectively, both disclose a transfer case including a gear axially movable in response to an increase in the rotary speed of one of the driven axles and thereby interrupts the four-wheel drive by disengaging a pair of gears transmitting torque to the auxiliary axle. Other four-wheel drive mechanisms are disclosed in U.S. Pat. Nos. 2,711,222, 3,295,625 and 3,481,436 respectively issued to C. J. Bock, N. A. Ordorica et al. and E. A. Wilkowski.

The transfer mechanisms disclosed in the foregoing patents involve an assembly in which the torque is transferred from the input to the output shafts by means of gears mounted on an intermediate or countershaft. These prior art assemblies are thus comprised of at least three levels which are satisfactory for mounting on many over-the-road and off-highway vehicles having adequate ground clearance to accommodate the depending transfer case and propeller shafts tranferring torque from the case to the drive axles. However, the size and dimensions of the prior art transfer cases are such that they are not readily adaptable to equipment requiring a low profile such as the vehicles utilized in underground mining operations.

U.S. Pat. Nos. 3,557,634 and 3,679,016 to L. A. Bixby disclose a differential transfer assembly in which the primary and auxiliary driving axles are driven from the same power shaft but that design requires two sets of drop gears, one in front and one to the rear of the differential, and a power shaft traversing the differential housing.

SUMMARY OF THE INVENTION

It is primary object of the present invention to provide a drive transfer assembly for a low profile four-wheel drive vehicle.

It is another object of the invention to provide a drive transfer assembly which is capable of operation in the traditional combination of either a two or four-wheel drive, or capable of operation as either a full four-wheel drive or a modified four-wheel drive in which the available torque is delivered in some predetermined ratio to the primary and secondary driving axles.

It is a further object of the invention to provide a drive transfer assembly including a clutch which is automatically actuated to shift into the full four-wheel drive mode of operation.

It is still another object of the invention to provide a drive transfer assembly including a spring biased clutch which will provide a four-wheel drive in the clutch engaged mode of operation and in the other mode of operation, depending upon the size or biasing force of the springs employed, may either deliver some proportion of the available torque to the auxiliary axle or allow the auxiliary axle to run free as in a conventional two-wheel drive vehicle.

It is a still further object of the present invention to provide a drive transfer assembly including a spring biased clutch in which any stresses resulting from interaxle speed differentials are released by the spring biased clutch.

A still further object of the invention is to provide a drive transfer assembly for transmitting torque from a source to one or both of a pair of output shafts. The output shafts preferably drive a primary and an auxiliary vehicle axle. The drive transfer assembly includes a first helical gear driven by the source, a second helical gear fixed for rotation with one of the output shafts and being driven by the first helical gear, a second output shaft axially aligned with the one output shaft and a clutch operable to drive the second output shaft. A third helical gear is mounted concentric with and axially movable on a portion of the second output shaft. The teeth of the third helical gear are engaged by the first helical gear and disposed to move the third helical gear in one axial direction to actuate the clutch when driven by the first helical gear.

A further object of the invention is to provide a clutch operable between an auxiliary output spindle and a helical driving gear in a torque transfer assembly. The clutch includes an annular member concentric with the auxiliary output spindle and having helical teeth engaged by the helical driving gear, the helical teeth tending to move the member in one axial direction when driven by the gear, a plurality of axially movable discs fixed for rotation with the annular member, a plurality of axially movable driven discs fixed for rotation with the output spindle with each driven disc positioned between a pair of adjacent discs fixed for rotation with the annular member, and means biasing the annular member in a direction opposite to said one axial direction.

The invention and the advantages offered thereby will become apparent from the following detailed description of the embodiment shown by the accompanying drawings.

DESCRIPTION OF THE DRAWINGS

In the drawings wherein like reference numerals refer to like parts.

DESCRIPTION OF THE DRAWINGS

Figure 1:
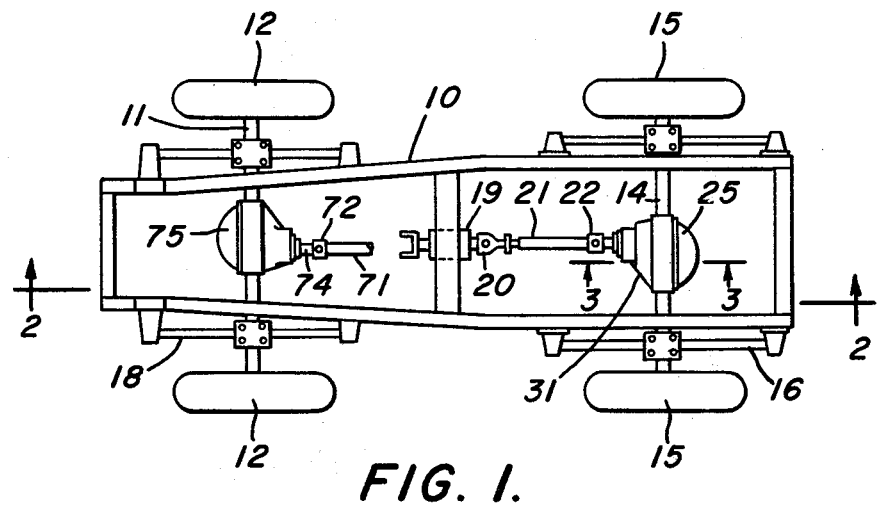
FIG. 1 is a diagrammatic plan view showing a preferred embodiment of the invention as incorporated in a vehicle; apparent from the following detailed description of the embodiment shown by the accompanying drawings.
Figure 2:
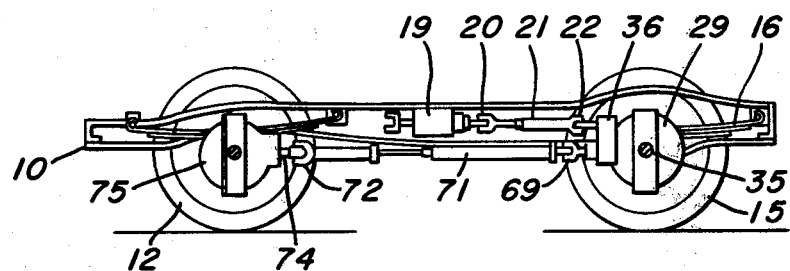
Figure 5:
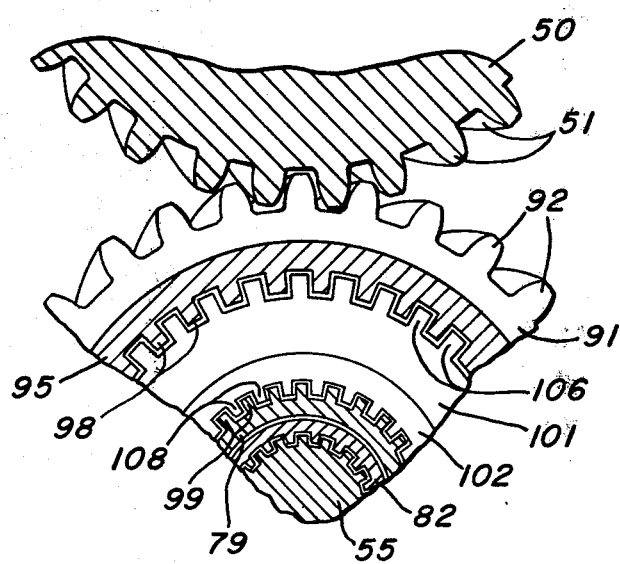
Figure 3:
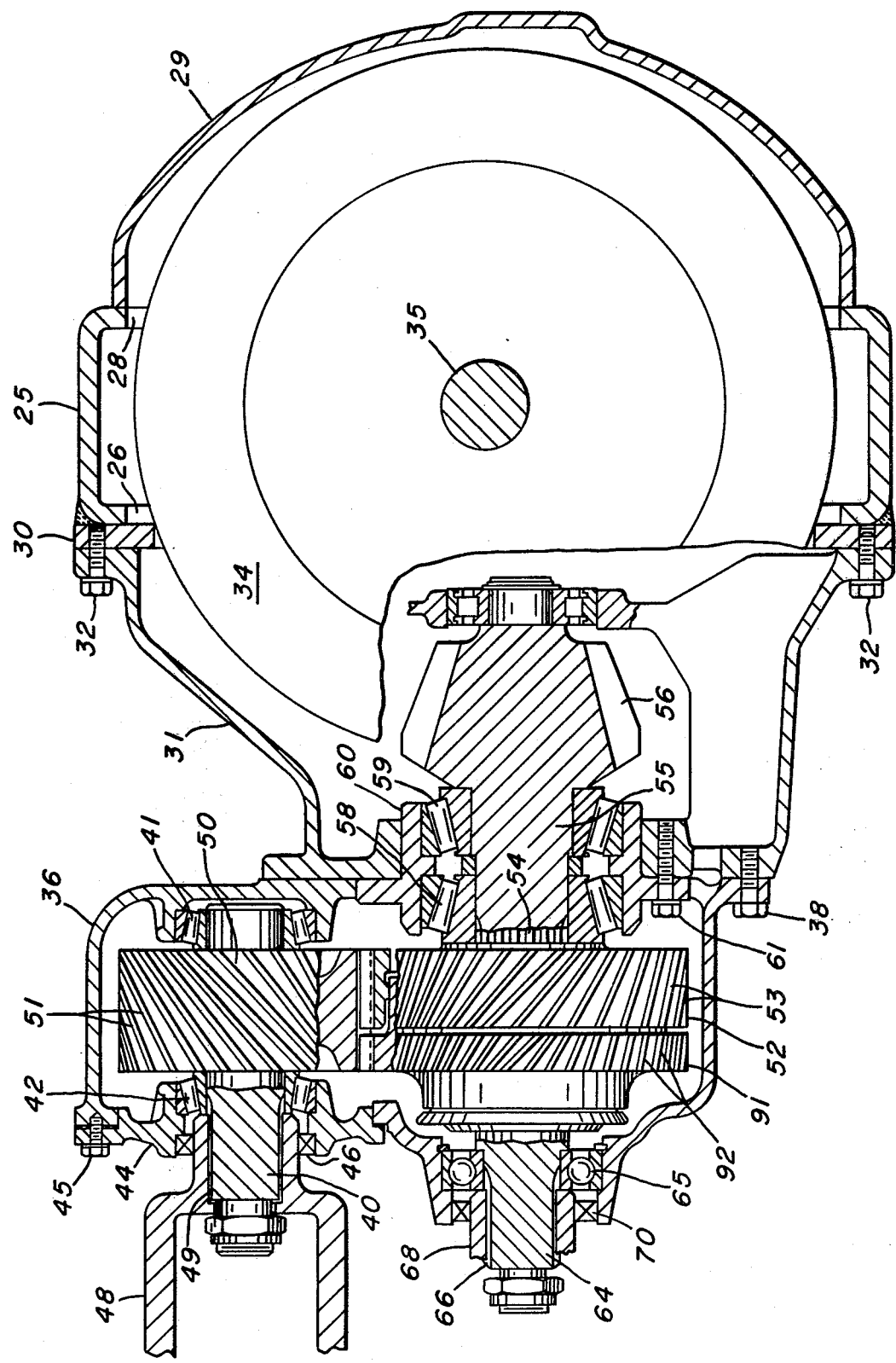
Figure 4:
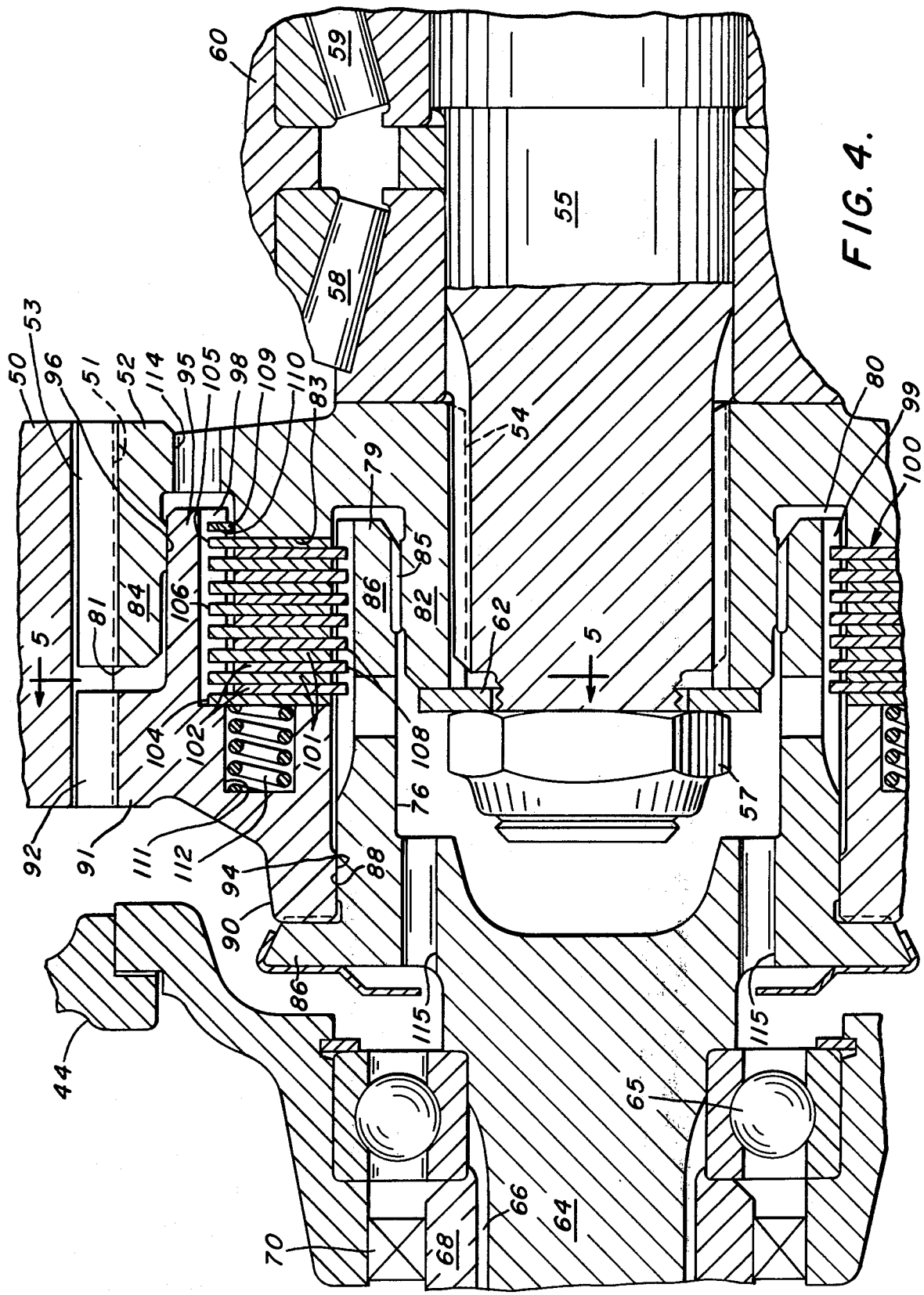

In the drawings wherein like reference numerals refer to like parts:

FIG. 1 is a diagrammatic plan view showing a preferred embodiment of the invention as incorporated in a vehicle;

FIG. 2 is a longitudinal section taken along the line 2—2 of FIG. 1;

FIG. 3 is a longitudinal section of the drive transfer assembly taken along line 3—3 of FIG. 1;

FIG. 4 is an enlarged view of a portion of the drive transfer assembly of FIG. 3, and FIG. 5 is a slightly enlarged fragmentary view, partly in section, taken along the line 5—5 of FIG. 4.

DESCRIPTION OF THE INVENTION

With reference to FIGS. 1 and 2 of the drawings, there is shown a vehicle chassis 10 supported by a forward steering drive axle assembly 11 having ground engaging wheels 12 and a rear drive axle 14 having ground engaging wheels 15. Axle assembly 14 is suspended from the chassis in conventional manner using leaf springs 16 and similar springs 18 are provided between the forward axle 11 and the chassis.

A transmission 19 is mounted about midway between the axles 11 and 14 and delivers the axle driving torque from a prime mover not shown. The transmission output is connected by a universal joint 20 to a propeller shaft 21. Shaft 21 is connected through a universal joint 22 to the input side of the rear drive axle assembly 14.

The preferred embodiment of the invention will thus be described as applied to a four-wheel drive vehicle in which the rear axle serves as the primary driving axle and the forward steering axle serves as an auxiliary driving axle.

The rear or primary drive axle 14 comprises a conventional non-rotatable housing 24 having an enlarged intermediate section 25 wherein the rear differential mechanism is mounted. As best shown in FIGS. 3 and 4, axle housing section 25 has front and rear openings 26 and 28. A domed cover plate 29 is welded to section 25 to close the rear opening 28. A ring 30 surrounding the forward opening 26 is welded to the section 25 as a reinforcement ring. A forwardly projecting housing 31 is secured over opening 26 by a row of studs 32.

Housing 31 and cover plate 29 enclose the rear or primary drive axle differential mechanism comprised of a ring gear 34 fixed to a carrier that rotates the bevel gear differential unit to drive a pair of side gears connected to opposed axle shafts 35 leading to the ground engaging rear wheels 15.

A drop gear housing or drive transfer case 36 is secured by means of a plurality of machine screws 38 over an opening in the forward end of housing 31. The housing 36 encloses the drive transfer assembly.

An input shaft 40 is rotatably mounted at one end by a tapered roller bearing 41 seated in a projection formed integrally with the housing 36. The other end of the shaft 40 is rotatably mounted in a tapered roller bearing 42 seated in a retainer 44. The bearing retainer is secured to the housing 36 by a plurality of machine screws 45 and carries an oil seal 46 surrounding the yoke hub 48 of the universal joint 22. The yoke hub 48 is splined at 49 to the input shaft 40. Between the bearings 41 and 42 the shaft 40 is integrally formed with a pinion gear 50.

The pinion gear 50 is preferably formed with twenty left hand helical teeth 51. The pinion gear 50 engages and drives a right hand helical gear 52 which is splined at 54 to the shaft 55 of the rear differential pinion 56. A thrust washer 62 abuts a nut 57 threaded to the end of pinion shaft 55 and limits axial movement of the helical gear 52 in one direction relative to the pinion shaft 55. The pinion shaft 55 is rotatably mounted by tapered roller bearings 58 and 59 seated in a bearing retainer 60 secured by a plurality of machine screws 61 to the forwarding projecting differential housing 31. The helical gear 52 abuts against the inner race of the tapered roller bearing 58. The bearing 58 thus limits movement of the gear in the other axial direction relative to the pinion shaft 55. The nut 57 and thrust washer 62 may be adjusted to properly seat the gear 52 and pinion shaft 55 against the bearings 58 and 59.

The rear differential pinion 56 drivingly engages the ring gear 34 of the primary driving axle 14 to drive the rear wheels 15 in response to rotary movement of the input shaft 40, gear 50 and gear 52.

A drive spindle 64 for the front or auxiliary drive axle 11 is rotatably mounted at one end by means of a ball bearing 65 to the housing 36. The spindle 64 is splined at 66 to the yoke hub 68 of a universal joint 69. An annular oil seal 70 is seated in the housing 36 and surrounds the yoke hub 68. The auxiliary drive axle spindle 64 is connected by the universal joint 69 to a propeller shaft 71 connected at its other end by a universal joint 72 to the pinion shaft 74 of the auxiliary drive axle differential 75.

The other end of the drive spindle 64 is formed as an axially extending hollow cylinder 76 the end portion 79 of which is received within a recess 80 formed in the sidewall 81 of helical gear 52. The recess 80 is bounded by a pair of radially spaced axially extending legs 82, 84 which are concentric with the pinion shaft 55. The end portion 79 of drive spindle 64 is provided with a hard surfaced annular bearing land 85 which seats against a hard surfaced bearing land 86 provided to the interior surface of the leg 82. The land 86 thus provides a rotary bearing support for the hollow cylindrical end portion of the drive spindle 64. The auxiliary drive spindle is thus mounted in axial alignment with the pinion shaft 55 with the driven end of the pinion shaft telescopically received within the hollow cylinder 76 formed at one end of the drive spindle 64.

The drive spindle 64 is also formed with a radially extending flange 86 and a bearing portion 88 on the exterior surface of the hollow cylinder 76 intermediate the flange 86 and the end portion 79. An annular member 90 comprised of a third helical gear portion 91 is mounted to the drive spindle 64 by means of a hard surfaced annular land 94 slidably received on the spindle bearing portion 88.

The annular member 90 is formed with an axially extending flange 95 concentric with and spaced radially outward from the end portion 79 of the hollow cylindrical portion 76 of drive spindle 64. The flange 95 is concentric with the end portion 79 of the drive spindle 64 and projects within the recess 80 of helical gear 52 where it bears against a hard surfaced annular bearing land 96 provided to the interior surface of the leg 84 of gear 52. The interfacing surfaces of the flange 95 and the end portion 79 of the drive spindle 64 are respectively splined at 98 and 99.

A multiple disc friction clutch generally designated by the numeral 100 is provided in the recess 80 between the flange 95 and the end portion 79 of the drive spindle 64. The friction clutch is comprised of a plurality of axially movable annular metal discs 101, 102 disposed between a pair of axially movable pressure plates 104 and 105. The pressure plates 104, 105 and alternate clutch discs 101 are provided with tabs 106 around their respective outer peripheries. The tabs 106, as best shown in FIG. 5, are received in the spaces between the splines 98 provided to the internal surface of the flange 95 of annular member 90. The tabs 106 are slightly smaller than the spaces between the splines 98 thereby permitting the pressure plates 104, 105 and clutch discs 101 to move relative to the axis of the annular member 90 and drive spindle 64 while securing the pressure plates and clutch discs 101 against rotation relative to the member 90.

The clutch discs 102 intermediate the pressure plates 104, 105 and the clutch discs 101 are provided with tabs 108 integrally formed around their inner peripheries. The tabs 108 are received in the spaces between the splines 99 provided to the end portion 79 of the drive spindle 64. The tabs 108 are slightly smaller than the spaces between the splines 99 thereby permitting the clutch discs 102 to move relative to the axis of the drive spindle 64 while restraining the discs 102 against rotation relative to the spindle 64.

The surfaces of the clutch discs 102 which are disposed opposite the surfaces of the pressure plates 104, 105 and alternate clutch discs 101 are preferable provided with a friction lining material. A sintered bronze friction material may be bonded to the oppositely disposed clutching surfaces of the annular metal discs 102 or any of a number of other friction materials may be employed.

The clutch discs 101 and 102 are freely axially movable within the spaces provided between the splines 98 and 99, such movement being limited by the pressure plates 104, 105. Axial movement of the pressure plates 104, 105 is limited at one end by annular member 90 which, in turn, abuts the radial flange 86 of drive spindle 64 and at the other end by an axially extending projection 83 intermediate the legs 82, 84 of helical gear 52. A snap ring 109 seated in a groove 110 cut through the splines 98 retains the clutch discs and pressure plates against displacement from the annular member 90 and the drive spindle 64 when the clutch is removed from the recess 80 of helical gear 52.

The annular member 90 is provided with a plurality of circumferentially spaced bores 111 mounting a plurality of springs 112. The springs 112 provide an axially directed biasing force between the annular member 90 and pressure plate 104 of the disc clutch 100. The springs 112 bias the annular member 90 in the direction of the flange 86 of drive spindle 64 and the pressure plate 104 in the direction of the projection 83 abutting the clutch disc or pressure plate 105 at the other axial end of the clutch 100. Although the size and number of bores 111 and springs 112 will be determined by the specifications for a particular drive transfer assembly, six or eight bores 111 containing an equivalent number of springs are considered adequate for the disclosed embodiment. As will be described more fully herebelow, the size or biasing force of the springs will depend upon the manner in which the drive transfer assembly is intended to operate in the clutch disengaged condition for a particular application.

The transfer case housing 36 is a sealed assembly containing a pool of lubricant distributed by movement of the gears and other rotating components of the drive transfer assembly. A plurality of lubricant passages 114 are circumferentially spaced around the helical gear 53 between the projection 83 and leg 84 to facilitate the flow of lubricant from the area around the bearing 58 to recess 80 within which the disc clutch 100 is nested between the annular member 90 and the end portion 79 of the drive spindle 64. In a similar manner, a plurality of circumferentially spaced lubrication passages 115 are provided through the drive spindle 64 radially inwardly of the radially extending flange 86 to facilitate the flow of lubricant between the area surrounding the bearing 65 and the hollow cylindrical portion 76 of drive spindle 64.

The disc clutch 100 is actuated by the annular member 90. The helical gear portion 91 is, like helical gear 52, provided with a plurality of right hand helical teeth 92 engaged with the left hand helical teeth 51 of pinion gear 50. However, the helical gear portion 91 of the clutch actuating annular member 90 is provided with one more gear tooth than the helical gear 52. A satisfactory speed reduction is obtained in the disclosed embodiment by making the helical gear 52 with twenty-seven teeth and the helical gear portion 91 of annular member 90 with twenty-eight teeth. By reason of this step down gearing, the pinion shaft 55 is normally driven at a faster speed than the annular member 90. In normal operation, if the disc clutch 100 is disengaged, the torque delivered from the transmission will be transferred from the first helical gear 50 to the second helical gear 52 and pinion shaft 55 where it drives the rear axle differential and ground engaging wheels 16. In normal operation, the front wheels 12 travel at the same speed as the rear wheels 15. The front wheel speed is transmitted back through the auxiliary drive axle differential 75 and propeller shaft 71 to the drive spindle 64 where the clutch discs 102, although not full engaged with the clutch discs 101, normally rotate at a slightly higher speed than the clutch discs 101.

However, should either of the rear wheels 15 begin to slip, the additional torque delivered from the transmission 19 will rotate the helical gear 52 at a faster rate of speed than the front wheels are rotating the drive spindle 64. Additional torque will overcome the force of springs 112 biasing the annular clutch actuating member 90 in the axial direction of flange 86 and, due to the inclination of the helical teeth 51 and 92, will shift the annular member 90 in the opposite axial direction along the bearing portion 88 of drive spindle 64. As the clutch actuating member 90 is displaced it will exert a force on the pressure plate 104 and compress the plurality of clutch discs 101 and 102 against the pressure plate 105 abutting the annular projection 83. The disc clutch 100 is thereby engaged and a portion of the driving torque delivered from the transmission 19 is transferred from the rear drive axle 14 to the auxiliary front drive axle 11 by means of the clutch 100 drivingly engaging the driven annular member 90 with the auxiliary drive spindle 64. The clutch 100 will remain engaged until the rear wheels 19 regain traction and drive the front wheels at the same ground engaging speed.

As previously pointed out, the size or biasing force of the springs 112 depend upon the manner in which the drive transfer assembly is intended to operate in the clutch disengaged condition for a particular application. If the desired operation is a conventional four-wheel drive, then the size or biasing force of the springs 112 shall be selected to be adequate to offset the lateral thrust applied to the annular member 90 by the teeth 51 of the helical gear 50 when the drive spindle 64 is driven by the front wheels 12 at a slightly lower speed than the pinion shaft 55. With such a selection of springs 112, the drive transfer assembly will normally operate as a two-wheel drive providing a power train to the primary drive axle assembly and the disc clutch will automatically engage upon slippage of the rear wheels to transfer a portion of the available torque to the auxiliary drive axle assembly.

The drive transfer assembly is also capable of operating as a modified four-wheel drive in which the available torque is normally delivered in some predetermined ratio to both the primary and secondary drive axle assemblies and then, in the event of slippage of the rear wheels, the disc clutch will become fully engaged to increase the amount of torque delivered to the auxiliary drive axle. In this modified form of operation the size and biasing force of the springs 112 is selected to be somewhat less than the force required to overcome the lateral thrust applied to the annular member 90 by the teeth 51 of the helical gear 50. The difference between the lateral thrust applied to the annular member 90 by the teeth 51 and the force of springs 112 is applied to pressure plate 104 and thus maintains the clutch discs 101 and 102 partly engaged at all times. The difference in force may be selected to provide the percentage of the available torque which is desired to be continually provided to the auxiliary drive axle.

The drive transfer assembly hereinabove described and as shown by FIG. 2 is particularly adaptable to a low profile vehicle. This is due to the two level transfer assembly in which the input or first helical gear is mounted for rotation about one axis and the output shafts are mounted for rotation about the same axis by the second and third helical gears with the disc clutch nested therebetween. This provides a hightly efficient, very compact arrangement in which adequate provision is made for lubricating all of the moving parts and the assembly may be easily mounted to the forward opening of a primary drive axle differential housing. The disc clutch also permits slippage between the driving and driven discs to accommodate different speeds of rotation between the wheels mounted on the primary driving axle and the wheels mounted on the auxiliary driving axle.

The invention may also be embodied in other specific forms without departing from the spirit or essential characteristics thereof. The foregoing description is therefore to be considered illustrative and not descriptive, the scope of the invention being defined by the appended claims and all changes which come within the meaning and equivalency of the claims are therefore intended to be embraced thereby.

We claim:

1. A drive transfer assembly for transmitting torque from a source to one or both of a pair of output shafts comprising:
   a first helical gear driven by said source,
   a second helical gear fixed for rotation with one of said output shafts, said second helical gear being engaged with and driven by said first helical gear,
   a second output shaft axially aligned with said one output shaft,
   a clutch operable to drive said second output shaft, and
   a third helical gear concentric with and axially movable on a portion of said second output shaft, the teeth of said third helical gear being engaged by said first helical gear and disposed to move said third helical gear in one axial direction to actuate said clutch when driven by said first helical gear at a rotary speed greater than the speed of said second output shaft.

2. The drive transfer assembly defined by claim 1 wherein said second outut shaft is integrally formed with a radially extending flange and an axially extending hollow cylinder, said third helical gear is slidably received on a portion of the exterior surface of said hollow cylinder adjacent said radially extending flange, said third helical gear is formed with an axially extending flange concentric with and spaced radially outward from a second portion of said hollow cylinder, and said second portion of said hollow cylinder and said radially spaced flange are spaced radially outward from said one output shaft and received for rotary bearing support within a recess provided to said second helical gear.

3. The drive transfer assembly defined by claim 2 wherein said clutch is comprised of a plurality of axially movable discs provided between said second portion of said hollow cylinder and said radially spaced flange, alternate ones of said plurality of discs are fixed against rotation to said radially spaced flange and intermediate ones of said plurality of discs are fixed against rotation relative to said second portion of said hollow cylinder, and means biasing said third helical gear away from said plurality of discs in a direction opposite to said one axial direction.

4. The drive transfer assembly defined by claim 3 wherein said recess provided to said second helical gear is bounded by a pair of radially spaced axially extending legs concentric with said one output shaft, means intermediate said pair of radially spaced axially extending legs and abutting a disc at one axial end of said plurality of discs, and means disposed in said recess biasing said third helical gear away from said plurality of discs toward said radially extending flange.

5. A drive transfer assembly for a vehicle having a set of wheels on a primary driving axle and a set of wheels on an auxiliary driving axle, both of said axles being drivable from a source of power, comprising:
   an input shaft adapted to be rotatably driven by said source of power,
   a pinion shaft for a primary axle differential,
   a drive spindle for an auxiliary axle, said driving spindle being axially aligned with said pinion shaft,
   first and second gears respectively mounted for rotation with said input shaft and said pinion shaft,
   said first and second gears being drivingly engaged by oppositely disposed helical teeth,
   a clutch operative to drive said drive spindle, and
   a third helical gear concentric with and axially movable on a portion of said drive spindle, the teeth of said third helical gear being engaged by said first helical gear and disposed to move said third helical gear in one axial direction to actuate said clutch when driven by said first helical gear at a rotary speed greater than the speed of said drive spindle.

6. The drive transfer assembly defined by claim 5 wherein said drive spindle is integrally formed with a radially extending flange and an axially extending hollow cylinder, said third helical gear is slidably received on a portion of the exterior surface of said hollow cylinder, said third helical gear is slidably received on a portion of the exterior surface of said hollow cylinder adjacent said radially extending flange, said third helical gear is formed with an axially extending flange concentric with and spaced radially outward from a second portion of said hollow cylinder and said second portion of said hollow cylinder and said radially spaced flange are spaced radially outward from said pinion shaft and received for rotary bearing support within a recess provided to said second helical gear.

7. The drive transfer assembly defined by claim 6 wherein said clutch is comprised of a plurality of axially movable discs provided between said second portion of said hollow cylinder and said radially spaced flange, alternate one of said plurality of discs are fixed against rotation to said radially spaced flange and intermediate ones of said plurality of discs are fixed against rotation relative to said second portion of said hollow cylinder, and means biasing said third helical gear away from said plurality of discs in a direction opposite to said one axial direction.

8. The drive transfer assembly defined by claim 7 wherein said recess provided to said second helical gear is bounded by a pair of radially spaced axially extending legs concentric with said pinion shaft, means intermediate said pairs of radially spaced axially extending legs and abutting a disc at one axial end of said plurality of discs, a recess provided in a surface of said third helical gear opposite the disc at the other axial end of said plurality of discs, and means disposed in said recess biasing said third helical gear away from said plurality of discs toward said radially extending flange.

9. A clutch operable between an auxiliary output spindle and a helical driving gear in a torque transfer assembly comprising:

a primary output shaft coaxial with said spindle, said spindle being integrally formed at its driven end with a radially extending flange and an axially extending hollow cylinder, a portion of said hollow cylinder being radially spaced outwardly from said shaft, an annular member slidably received on a portion of the exterior surface of said cylinder, said annular member being concentric with said auxiliary output spindle and having helical teeth engaged by said helical driving gear, said helical teeth tending to move said member in one axial direction when driven by said gear, a plurality of axially movable discs fixed for rotation with said annular member, a plurality of axially movable discs fixed for rotation with said output spindle with each said driven discs positioned between a pair of adjacent discs fixed for rotation with said annular member, and means biasing said annular member in a direction opposite to said one axial direction.

10. The clutch defined by claim 9 wherein said plurality of axially movable discs are splined to said portion of said hollow cylinder radially spaced outwardly from said primary output shaft, said annular member is positioned between said discs and said radially extending flange, and a plurality of springs bias said annular member toward said flange.

* * * * *

UNITED STATES PATENT AND TRADEMARK OFFICE
CERTIFICATE OF CORRECTION

PATENT NO. : 4,140,030
DATED : February 20, 1979
INVENTOR(S) : John E. Williams and Beverly W. Keese It is certified that error appears in the above—identified patent and that said Letters Patent are hereby corrected as shown below:

Column 3, delete lines 1 through 9 in their entirety.

Signed and Sealed this

Twenty-ninth Day of May 1979

[SEAL]

Attest:

RUTH C. MASON
Attesting Officer

DONALD W. BANNER
Commissioner of Patents and Trademarks